United States Patent [19]
Shirota et al.

[11] Patent Number: 5,792,249
[45] Date of Patent: Aug. 11, 1998

[54] LIQUID COMPOSITION, INK SET, IMAGE-FORMING METHOD AND APPARATUS USING THE SAME

[75] Inventors: Katsuhiro Shirota, Kawasaki; Yutaka Kurabayashi, Tokorozawa; Katsuhiko Takahashi, Yokohama, all of Japan

[73] Assignee: Canon Kabushiki Kaisha, Tokyo, Japan

[21] Appl. No.: 590,435

[22] Filed: Jan. 23, 1996

[30] Foreign Application Priority Data

Jan. 25, 1995 [JP] Japan .................. 7-027724
Jan. 4, 1996 [JP] Japan .................. 8-014759

[51] Int. Cl.$^6$ .................................. C09D 11/02
[52] U.S. Cl. ................... 106/31.27; 106/314.3; 106/31.6; 106/31.75
[58] Field of Search ............ 106/20 R, 22 R, 106/22 H, 20 D, 31.27, 31.6, 31.43, 31.75

[56] References Cited

U.S. PATENT DOCUMENTS 4,361,842  11/1982  Haruta et al. ............... 106/22 K

FOREIGN PATENT DOCUMENTS

| 61-59912 | 5/1979 | Japan . |
| 61-59914 | 2/1980 | Japan . |
| 55-65269 | 5/1980 | Japan . |
| 55-66976 | 5/1980 | Japan . |
| 63-60783 | 3/1988 | Japan . |
| 63-299970 | 12/1988 | Japan . |
| 63-299971 | 12/1988 | Japan . |
| 64-63185 | 3/1989 | Japan . |
| 5-202308 | 8/1993 | Japan . |

OTHER PUBLICATIONS

English translation of JP63/299970, Dec. 1988.

*Primary Examiner*—Helene Klemanski
*Attorney, Agent, or Firm*—Fitzpatrick, Cella, Harper & Scinto

[57] ABSTRACT

The invention provides a liquid composition containing a metallic coordination compound in a solvent, an ink set in which the liquid composition is combined with one or more inks, a method of forming an image, and an image-forming apparatus applying them.

25 Claims, 4 Drawing Sheets

CARRIAGE MOVING DIRECTION

FIG. 8

LIQUID COMPOSITION, INK SET, IMAGE-FORMING METHOD AND APPARATUS USING THE SAME

BACKGROUND OF THE INVENTION

1. Field of the Invention

The present invention relates to a technique for obtaining a waterproof ink image with decreased color-bleeding when a color image is formed on plain paper. In particular, it relates to a liquid composition useful in image formation by means of an ink-jet system, an ink set combining the liquid composition with one or more inks, and a method and apparatus for forming an image using them.

2. Related Background Art

Ink-jet recording methods include recording by adhering ejected ink or inks to a recording medium such as paper. According to Japanese Patent Publication Nos. 61-59912, and 61-59914, a recording head having high density multi-orifices can be used in an ink-jet recording method in which liquid drops are discharged by forming bubbles in the ink by means of thermal energy from an electro-thermal transducer as the discharge energy supplying means. Moreover, an image having high resolution and high quality can be recorded at high speed.

However, conventional inks used for ink-jet recording generally include water as the major component and contain water-soluble solvents having a high boiling temperature, such as glycol, in order to prevent drying and clogging. Therefore, when recording on plain paper as the recording medium with such inks, the following problem occurs: The image cannot be satisfactorily fixed, and is not formed homogeneously, possibly due to non-homogeneous distribution of fillers and sizing agents on the recording medium surface. In particular, when forming color images, different color inks are continuously overlapped before each color ink is completely fixed on the paper. Thus, at the boundary portion of different colors in the image, non-homogeneous color mixing (this phenomena is called "bleeding" below) is observed.

As a means of enhancing fixing performance, the addition of a compound which improves permeability, such as a surfactant, to the inks is disclosed in Japanese Patent Laid-Open No. 55-65269. Further, an ink mainly containing volatile solvents is disclosed in Japanese Patent Laid-Open No. 55-66976. In the former disclosure, although fixing performance and bleeding resistance can be improved to some extent due to enhanced permeability of the ink into the recording paper, the coloring agent permeates deep into the inside of the paper together with the ink. Therefore, various problems are observed as follows: Image density and color saturation decrease, and the sharpness and resolution at the image edge portion also decrease at the same time, due to the horizontal spreading of the ink. Moreover, in the latter disclosure, the nozzle in the recording head easily clogs due to the evaporation of the solvent, in addition to the above problems.

In order to solve the above problems, a method is disclosed in which a liquid composition having various functions to improve image formation is adhered to the recording medium in advance of the discharge of ink. For example, Japanese Patent Laid-Open No. 63-299971 describes a method for discharging an ink containing an anionic dyestuff, after adhering a liquid composition containing an organic compound having at least two cationic groups in the molecule to the recording medium.

Moreover, each of Japanese Patent Laid-Open Nos. 63-60783 and 64-63185 discloses a method of discharging a liquid composition containing a basic polymer in advance of recording with the ink. However, all of these methods have the problem that the light resistance of the dyestuff significantly decreases because of the use of a polymer having a cationic group or groups.

Each of Japanese Patent Laid-Open Nos. 63-299970 and 5-202308 discloses a method for forming an image with a plurality of inks after ejecting multivalent metal salts, i.e. compounds formed by ion bonding between various metallic ions and anions such as halogen compounds and organic acids on the recording medium. Because these multivalent metal salts generally have poor solubility to organic solvents such as glycerin, diethylene glycol, and the like, the tip of the nozzle, through which the liquid drop is discharged, clogs due to the precipitation of the metal salts contained in the liquid composition during ink-jet recording. When a liquid composition containing such multivalent metal salts is used in an ink-jet system in which recording is performed by discharging ink drops due to a bubble formed by thermal energy, the multivalent metal salt precipitates on the heater, thus inhibiting the discharge of the ink drop.

SUMMARY OF THE INVENTION

An object of the present invention is to provide a liquid composition used for a method of forming an image, an ink set using the liquid composition, and a method and apparatus for forming the image, in which the above problems are solved as described below. The present invention intends to achieve the following recording performance goals, when ink-jet recording is performed on plain paper:

(1) The quality of characters and fixing performance are excellent; and (2) The homogeneity of a solid image is excellent with sufficient image density.

Further, the present invention intends to achieve the following recording performance goals, when a color image is formed on plain paper:

(3) Bleeding is prevented;

(4) Color reproducibility is excellent and a high definition recording image is obtainable;

(5) The recording image is completely waterproof; and (6) The recording image has sufficient light resistance.

The above objects can be accomplished by the present invention as follows.

The first embodiment of the present invention includes a liquid composition containing a metallic coordination compound in a solvent, wherein the metallic coordination compound comprises a ligand and a metallic ion.

The second embodiment of the present invention includes an ink set comprising a combination of the liquid composition of the first embodiment and at least one ink selected from the group consisting of yellow, magenta, cyan, black, red, blue, and green. Further, the third embodiment includes an ink set comprising a combination of the liquid composition of the first embodiment and four color inks, namely, yellow, magenta, cyan, and black.

The fifth embodiment includes a method of forming an image comprising a step (A) of adhering the liquid composition of the first embodiment to at least an image-forming region of a recording medium, and a step (B) of discharging an ink containing at least an anionic compound onto said recording medium by an ink-jet system.

A further embodiment includes an apparatus for forming an image having the ink set of the second embodiment and an ink-jet means, in particular, an apparatus for forming an image comprising a first recording unit having a reserving portion and a discharging means for the liquid composition of the first embodiment and a second recording unit having a reserving portion and a discharging means for an ink comprising an anionic compound.

Further objects, features and advantages of the present invention will become apparent from the following description of the preferred embodiments with reference to the attached drawings.

DETAILED DESCRIPTION OF THE PREFERRED EMBODIMENTS

The present invention intends to achieve the above described objects by precipitating a coloring agent by mixing the liquid composition and the ink containing the coloring agent on the recording paper or at the position in which both permeate. Since the metallic coordination compound contained in the liquid composition and the coloring agent contained in the ink, i.e. the dyestuff having at least an anionic group, are mixed on the recording medium, such as recording paper and the like, the metal in the center of the metallic coordination compound precipitates by reaction with the coloring agent in the ink. In this reaction, the metal coordinated with surrounding ligands is liberated from the center of the coordination compound to make a salt, in other words, to form a lake, with acidic groups or anionic groups such as carboxylate group and sulfonate group in the dyestuff molecule. The lake dyestuff is similar in light resistance to the liquid composition of the present invention, but is inferior in reliability. A dispersing step, which is essential for the use of a conventional lake dyestuff, is not required in the present invention. Further, a method similar to methods for inks containing general water-soluble dyestuffs can be used in order to prevent clogging, which is important to the ink-jet recording method. Thus, the present invention does not decrease ejection reliability during operation.

When using a dyestuff which promotes lake formation on the recording medium when mixing the ink and the liquid which contains the metallic coordination compounds in the present invention, bleeding between different colors or recording dots on the recording paper can be prevented, in addition to improving the light resistance of the image. That is due to the suppressed ink mixing at the boundary, since the dyestuff can instantaneously precipitate upon the lake formation reaction.

In contrast, when using a dyestuff with lake formation on the recording media when mixing the ink and the liquid which contains the metallic coordination compound, it is difficult to perfectly prevent occasional bleeding. In the present invention, bleeding can be effectively prevented by including a polymer in addition to the metallic coordination compound in the liquid composition. It is thought that the associated compound, as it is neutralized and precipitated by the ionic interaction of the central metallic ion in the ligand, is adsorbed by the polymer to form a macro aggregate, so that ink mixing is prevented at the boundary.

The dyestuff compound mainly fixes on the surface of the recording medium such as recording paper, due to the above-described precipitation in the present invention. Therefore, the dyestuff compound not only improves the fixing performance, but also solves at the same time problems such as coloring characteristics of the recorded image, and irregular color and ink permeation to the back surface of the paper.

The present invention will now be explained in more detail with preferred embodiments.

First, the liquid composition of the present invention will be described.

The components of the liquid composition of the present invention include (1) a metallic coordination compound and, optionally, (2) a polymer used with the metallic coordination compound, other than a solvent. The "liquid composition" here does not include a coloring agent such as dyestuff or pigment. Both compounds are described in detail below.

(1) Metallic coordination compound

The metallic coordination compound generally refers to compounds in which a metallic ion is surrounded by an electron donor, i.e. ligand, which is capable of coordinating with the metallic ion. Elements composing the ligand, which are capable of coordinating with the metallic ion, are limited to the group V and VI elements in the periodic table. Typical elements are N, O, P, and S. Metallic coordination compounds containing nitrogen and oxygen atoms in the ligand are preferably used in the present invention, because lake formation is promoted.

The ligands composed of these elements are classified into two categories; unidentate ligands having one electron donor group per ligand or molecule, and multidentate ligands having two or more electron donor groups per ligand or molecule. Table 1 shows examples of ligands classified by the coordination number.

TABLE 1

| Coordination Number | Examples of Ligands — Ligands |
|---|---|
| 1 | Ammonia |
|  | Water |
|  | Acetic acid |
|  | Halogens |
| 2 | Glycine |
|  | Ethylenediamine |
|  | Propylenediamine |
|  | Lactic acid |
| 3 | Iminodiacetic acid |
|  | Diethylenetriamine |
| 4 | Dihydroxyethylglycine |
|  | Hydroxyethyliminodiacetic acid |
|  | Nitrilotriacetic acid |
| 5 | Ethylenediaminetetraacetic acid |
|  | Hydroxyethylethylenediaminetetraacetic acid |
| 6 | Diethylenetriaminepentaacetic acid |
| 7 | Triethylenetetraminehexaacetic acid |

Among these, metallic coordination compounds having ligands of a coordination number of 2 or more are desirably used in the present invention. Preferred metallic coordination compounds have ligands of a coordination number of 3 or more. However, any other metallic coordination compound having a ligand of a coordination number of 2 or more, other than compounds shown in Table 1, may also be suitably used without restriction.

Examples of the desirable metallic ion or central metal coordinated by ligands described above include multivalent metallic ions. Preferable multivalent metallic ions include aluminum ion, nickel ion, copper ion, barium ion, calcium ion, iron ion, and chromium ion, since these metallic ions effectively improve the light resistance of the dyestuff.

As described above, the liquid composition of the present invention contains the metallic coordination compound including the ligand and metallic ion. The metallic coordination compound can be produced by any conventional method as described, for example, in "Mukikagaku no Kiso (Fundamental Inorganic Chemistry)" edited by Japan Chemical Society.

Although the preferred content of the metallic coordination compound in the liquid composition is generally 0.05 to 8.0 percent by weight, the optimum content should be determined according to the combination of the compounds actually used.

In the liquid composition of the present invention, it is desirable to reduce the metallic ion concentration not coordinated with the ligand in order to prevent clogging at the tip of the ink-jet head, and to improve continuity of discharge characteristics on recording by jetting the liquid by means of thermal energy applied to the ink and solvent. Such uncoordinated metallic ion can be reduced by sufficient reaction of the metallic ion with the ligand when preparing the metallic coordination compound.

When using metallic ions such as aluminum ion and chromium ion, which form the coordination compounds relatively slowly, any operation for promoting the reaction, such as boiling, can be preferably employed. Such an operation reduces the uncoordinated metallic ions. Further, since the reactivity depends on the pH of the solution, the optimum pH should be determined according to the combination of the metal with the ligand.

(2) Polymer

The polymer contained in the liquid composition with the metallic coordination compound will now be explained.

As described above, the role of the polymer added to the liquid composition is to effectively prevent bleeding on the printing medium. When bleeding is prevented by addition of only the metallic coordination compound, the polymer need not be added. However, when using a dyestuff having lesser lake formation ability, it is desirable that the liquid composition further include a polymer having a number average molecular weight of 1,000 or more. When the molecular weight of the polymer exceeds 1,000, the polymer may readily adsorb the associated molecules to form a macro aggregate, so that bleeding can be effectively prevented.

Examples of the polymer which can be used in the liquid composition of the present invention include cationic polymers such as hydrochloric acid salt of polyallylamine, hydrochloric acid salt of polyaminesulfone, hydrochloric acid salt of polyvinyl amine, and acetic acid salt of chitosan, and nonionic polymers such as polyacrylamide, polyvinyl alcohol, and polyvinyl pyrrolidone. Further, cationic polymers, in which cationic groups are introduced in a part of the nonionic polymer, may also be used. Examples of such polymers include the copolymer of vinyl pyrrolidone and the quaternary salt of alkylamino acrylate, and the copolymer of acrylamide and the quaternary salt of aminomethyl acrylamide. Other polymers can also be used without restriction.

Of the above cationic and noninoic polymers, water soluble polymers are most suitably used. Dispersion systems such as latexes and emulsions can also be used.

The preferable content of these polymers in the liquid solution ranges from 0.05 to 20 percent by weight. The content should be determined according to the combination of the materials used.

Other components of the liquid composition of the present invention are described below.

The liquid composition generally comprises a solvent, such as water and/or a water-soluble organic solvent, and other additives, in addition to the metallic coordination compound (1) and the optionally added polymer (2).

Examples of the water-soluble organic solvent used in the present invention include amide compounds such as dimethylformamide and dimethylacetamide; ketone compounds such as acetone; ether compounds such as tetrahydrofuran and dioxane; poly(alkylene glycol) compounds such as polyethylene glycol and polypropylene glycol; alkylene glycol compounds such as ethylene glycol, propylene glycol, butylene glycol, triethylene glycol, 1,2,6-hexanetriol, thiodiethylene glycol, hexylene glycol, and diethylene glycol; lower alkyl ether compounds of polyhydric alcohols such as ethylene glycol methyl ether, diethylene glycol monomethyl ether, and triethylene glycol monomethyl ether; monohydric alcohol compounds such as ethanol, isopropyl alcohol, n-butyl alcohol, and isobutyl alcohol; and other compounds such as glycerin, N-methyl-2-pyrrolidone, 1,3-dimethyl-imidazolidinone, triethanolamine, sulfolane, and dimethyl sulfoxide.

Although the content of the water-soluble organic solvent is not restricted, it desirably ranges from 5 to 60 percent by weight, and preferably from 5 to 70 percent by weight. Other additives such as viscosity modifiers, pH modifiers, antiseptics, surfactants, antioxidants, and vaporization promoters can be added to the liquid composition if necessary. Among them, the choice of surfactant is especially important to adjust the permeability of the liquid into the recording medium.

Preferable physical values of the liquid composition are 3 to 12 for pH, 0 to 60 dyn/cm at around 25° C. for surface tension, and 1 to 30 cps at around 25° C. for viscosity.

The ink composing the ink set of the present invention is described below. The ink used in the present invention comprises an anionic compound. For example, it may comprise a water-soluble dyestuff containing at least an anionic group as a coloring agent, and water or a mixture of water and a water-soluble organic solvent. The ink may contain other additives such as viscosity modifiers, pH modifiers, antiseptics, surfactants, and antioxidants, as needed.

As the water-soluble dyestuff having an anionic group used in the present invention, water-soluble acidic dyestuffs, direct dyestuffs, and reactive dyestuffs described in the "COLOR INDEX" can be used without restriction. Of course, other dyestuffs not described in the "COLOR INDEX" can be used without restriction when the dyestuffs have anionic groups such as a sulfone group or a carboxyl group. The water-soluble dyestuffs means dyestuffs soluble in water in the region exceeding a certain pH, but insoluble in the lower pH region to form the precipitation. A dyestuff having a carboxyl group is preferable since lake formation between the metallic coordination compound and the dyestuff occurs more readily, compared with other dyestuffs.

Examples of the dyestuffs used in the present invention are as follows: Dyestuffs for the yellow ink are C.I. Direct Yellow 142, 144 and 86, and Acid Yellow 23 and the like; dyestuffs for the magenta ink are C.I. Acid Red 92, 289, 35, 37 and 52, and the like; dyestuffs for the cyan ink are C.I. Acid Blue 9, 7, 103, 1, and 90, C.I. Direct Blue 86, 87 and 199, and the like; dyestuffs for the black ink are C.I. Direct Black 52, 154 and 195 and the like. Other dyestuffs also may be used without restriction.

The desirable dyestuff content in the ink is 0.1 to 10 percent by weight. When the content is less than 0.1 percent, it is difficult to read the printed letters. On the other hand, when the content exceeds 10 percent, undesirable clogging may occur, depending on the dyestuff.

The same water-soluble organic solvent as that used in the liquid composition can be used in the ink. The preferable content also is the same. Moreover, the desirable physical properties of the ink are the same; at around 25° C., 3 to 12 for pH, 0 to 60 dyn/cm for surface tension, and 1 to 30 cps for viscosity. However, it is desirable that the surface tension of the liquid composition be lower than that of the ink, so as to enhance the effects of the present invention. Although the reason is not certain, it may be that the liquid composition homogenizes the wettability of the ink.

Any anionic surfactant or anionic polymer can be added to the ink in order to further enhance the effects of the present invention. Further, any amphoteric surfactant can also be used by adjusting the ink to a pH higher than the equipotential pH. Any conventional surfactant such as carboxylate salt type, sulfate ester type, sulfonate salt type, and phosphate ester type can be used without restriction as an anionic surfactant. Examples of the anionic polymer include alkaline-soluble resins such as poly(sodium acrylate), and copolymers with an acrylic acid minor component. Other polymers may be used similarly.

Any conventional recording medium can be used in the present invention. For example, plain paper such as copy paper or bond paper can be preferably used. Further, coated paper designed for ink-jet recording and transparent film for OHP (overhead projection), as well as wood-free paper and glossy paper, can also be preferably used.

According to the method for forming the image of the present invention, the image is formed by adhering the liquid composition and the ink in the image forming regions or in the image forming regions and their neighborhoods. The image forming region means the region where the ink dot adheres, and the neighborhood means the region at a distance of one to five dots from the region where the ink dot adheres.

In the present invention, the liquid composition may be adhered to the recording medium before or after the ink adhering.

As the method of adhering the liquid composition, although a method of adhering to the entire surface of the recording medium, such as a spraying method or a roller method, can be used, selective and homogeneous adhering to the image forming regions and their neighborhoods, to which the ink is adhered, is preferred so as to form a better image. Thus, an ink-jet system enabling such adhering is preferably used in the present invention. An on-demand ink-jet system is preferably used. Although any ink-jet system can be used, a method in which the liquid drop is jetted by applying thermal energy to the ink and liquid composition is most suitable because high density recording, high speed recording and high definition recording can be easily accomplished.

When performing color recording with an ink-jet system using an ink set comprising one or more color ink(s) of yellow, magenta, cyan, black, red, blue and green and the liquid composition of the present invention, a high density, high definition color image can be easily formed at high speed. The preferred color combination is a three-color set of yellow, magenta and cyan, or a four color set of these three colors and black.

The recording apparatus used for the image-forming method of the present invention is explained below. As described above, the preferred image-forming method is the method in which the liquid drop is jetted by thermal energy produced by a recording signal provided to the ink in the recording head. The structure of the recording head, the main component of the apparatus is shown in FIGS. 1, 2 and 3.

The head 13 is produced by the adhesion of a plate having a groove 14 through which ink flows, made of glass, ceramic, or plastic, and a heating head 15 including a heating resistance layer for thermal recording (in these figures, although a thin-film head is shown, it is for the purpose of description and not of limitation). The heating head 15 comprises a protecting film 16 formed of silicon oxide and the like, aluminum electrodes 17-1 and 17-2, a heating resistance layer 18 made of nichrome, a heat accumulating layer 19, and a radiating substrate 20 such as an alumina substrate.

The ink 21 reaches a discharge orifice 22 and forms a meniscus due to pressure. When applying an electric signal to electrodes 17-1 and 17-2, the region n in the heating head 15 is rapidly heated, and a bubble forms in the ink in contact with the heating head 15. The meniscus 23 protrudes by the pressure due to bubble formation. Then, the ink drop 24 formed at the discharge orifice 22 is ejected toward the recording medium 25.

Figure 1:
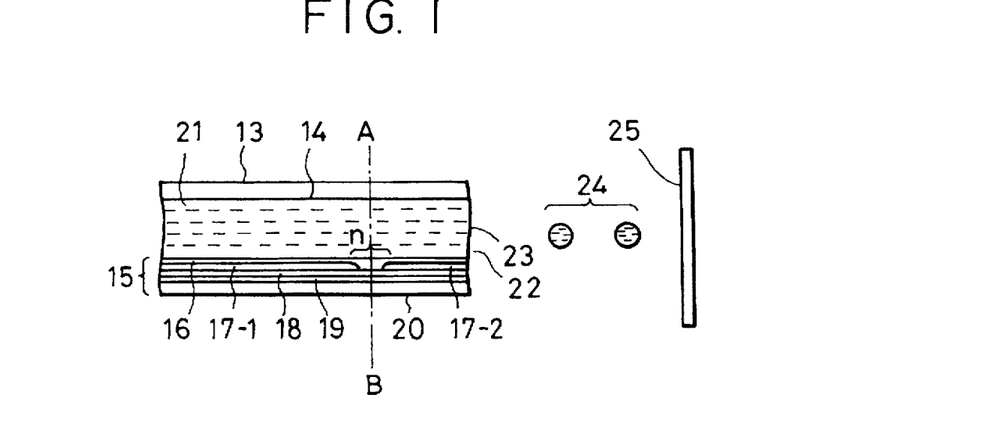
FIG. 1 is a vertical sectional view of a head portion of an ink-jet recording apparatus.
Figure 2:
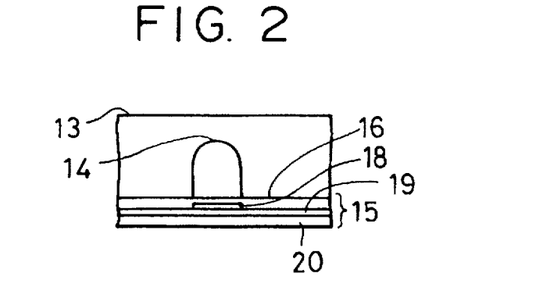
FIG. 2 is a cross-sectional view of the head portion of the ink-jet recording apparatus.
Figure 3:
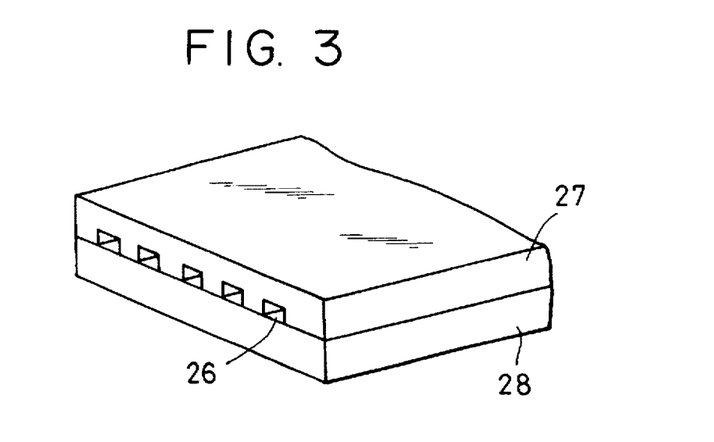
FIG. 3 is a perspective view of the head portion of the ink-jet recording apparatus.

FIG. 3 is a perspective view of a recording head in which a number of nozzles as shown in FIG. 1 are arranged. This recording head is made by adhering a plate 27 such as a glass plate having a number of passages 26 to a heating head 28 similar to that described in FIG. 1. While FIG. 1 is a cross-sectional view of the head 13 along the ink passage, FIG. 2 is a cross-sectional view at the line A–B of FIG. 1.

Figure 4:
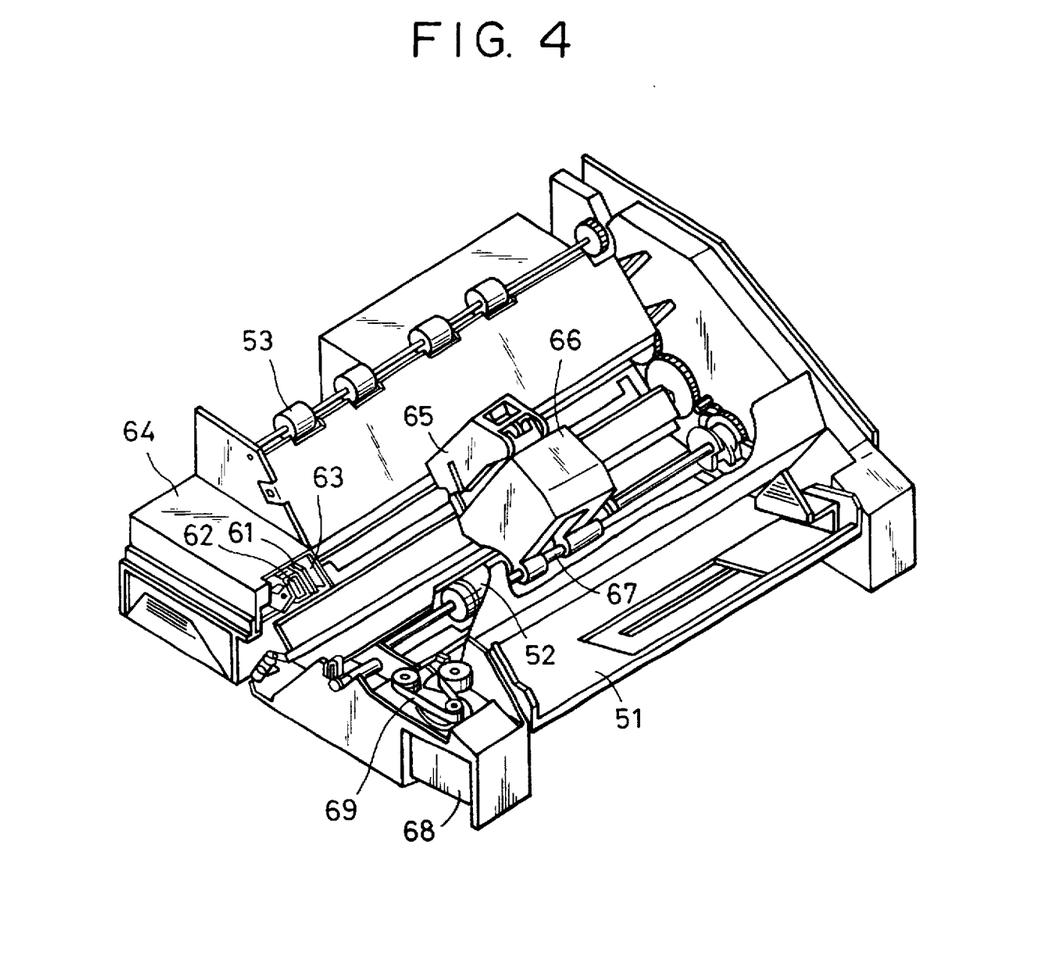
FIG. 4 is a perspective view exemplifying an ink-jet recording apparatus.

FIG. 4 is an example of the ink-jet recording apparatus incorporating the above-described head. In FIG. 4, an end of a blade 61, acting as a wiper, is held by a blade holding member to form a fixed end formed as a cantilever. The blade 61 is provided at a position adjacent a recording region by the recording head 65, and in this embodiment, the blade 61 is held so as to protrude into the path of movement of the recording head 65. A cap 62 for the ink-jet portion of the recording head 65 is placed at the home position adjacent the blade 61. The cap 62 moves in the direction perpendicular to the direction of movement of the recording head 65, and can contact the ink ejection opening face to cap it. An ink absorbent 63 is provided adjacent the blade 61, and protrudes 5 into the path of movement of the recording head 65, like the blade 61. A ink-jet recovery portion 64 consists of the blade 61, the cap 62, and the ink absorbent 63. The blade 61 and the ink adsorbent 63 remove water, dust and the like from the ink ejection opening face.

The recording head 65 has an energy-generating means and records images on the recording medium opposite the ink-jet portion having a nozzle, by jetting the ink. A carriage 66 is provided to carry the recording head 65 mounted on the carriage 66. The carriage 66 is attached so as to slide along a guide shaft 67, and a part of the carriage 66 connects with a belt 69 driven by a motor 68 (the connection is not shown in FIG. 4).

Since the carriage 66 can move along the guide shaft 67, the recording head 65 can also move to the recording regions and their surrounding regions.

The recording medium is fed to a position opposite the ink-jet portion of the recording head 65 by a feeder 51 inserting the recording medium and a carrying roll 52 driven by a motor (not shown), and is discharged to a discharge portion provided with a discharge roll 53 as recording proceeds.

When the recording head returns to the home position, for example, when recording is completed, the cap 62 in the ink-jet recovery portion 64 recedes from the path of movement of the recording head 65, but the blade 61 protrudes into the path of movement. As a result, the ink-jet portion of the recording head 65 is wiped. When the cap 62 contacts the ink-jet portion of the recording head 65 in order to cap the ink-jet portion, the cap 62 moves so as to protrude into the path of movement of the recording head. When the recording head 65 moves from the home position to a position starting the recording, since the cap 62 and blade 61 are located at the same position as that at wiping, the ink-jet portion of the recording head 65 is also wiped by this motion. The recording head 65 moves to the home position at the time of completion of recording and recovery of the ink-jet. Further, the recording head 65 moves to the home position for wiping at predetermined intervals when the recording head 65 moves between recording regions.

Figure 5:
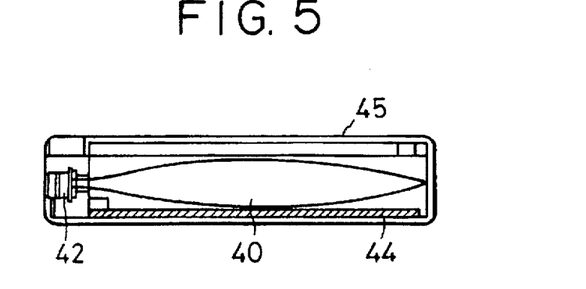
FIG. 5 is a vertical sectional view of an ink cartridge.

FIG. 5 is an embodiment of the ink cartridge 45 containing the ink to be fed to the head though an ink feeding member such as a tube. The ink is stored in an ink reservoir 40, for example an ink bag, having a rubber stopper 42 at the opening end. The ink in the ink bag 40 can be fed to the head by inserting a needle (not shown in the figure) into the stopper 42. Waste ink is absorbed with an ink absorbent 44. Desirable materials for the surface which contacts the ink in the ink reservoir are polyolefin compounds, in particular, polyethylene.

Figure 6:
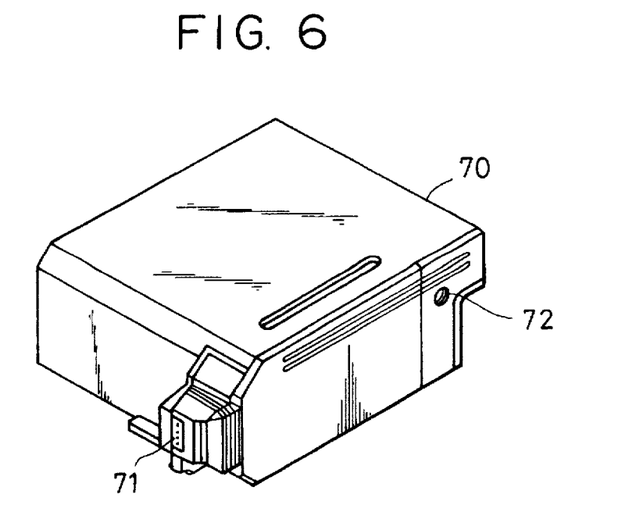
FIG. 6 is a perspective view of a recording unit.

As the ink-jet recording apparatus used in the present invention, an apparatus integrating the head and ink cartridge, as shown in FIG. 6, can be preferably used instead of the separate type of apparatus described above. In FIG. 6, a recording unit 70 contains the ink reservoir such as an ink absorbing member, and the ink in the ink absorbing member is discharged as an ink drop from a head portion 71 having plural orifices. As an example of the material composing the ink absorbing member, a polyurethane foam may be used. An opening 72 is provided to communicate air to the recording unit inside. The recording unit 70 is used instead of the recording head shown in FIG. 4 and is freely loaded and unloaded. In the present invention, an ink-jet recording apparatus which discharges the ink drops by applying thermal energy to the ink has been described. However, other types of ink-jet recording apparatuses, such as the piezoelectric type, can also be used.

Figure 7:
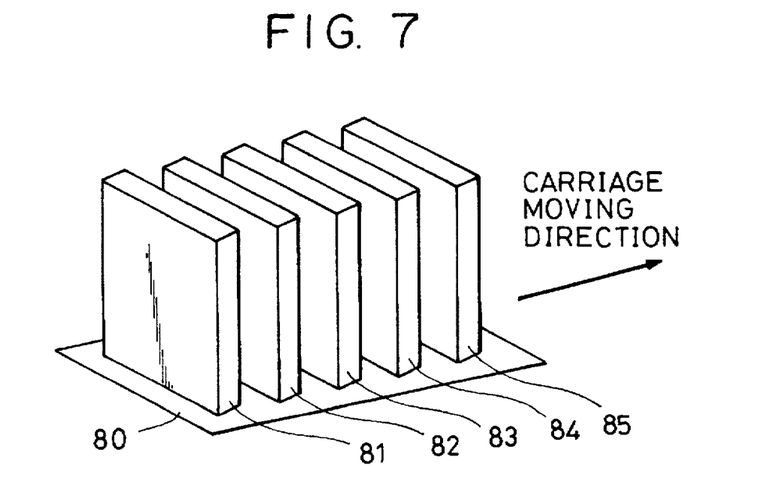
FIG. 7 is a perspective view illustrating a recording portion in which plural recording heads, used in the examples of the present invention, are arranged.
Figure 8:
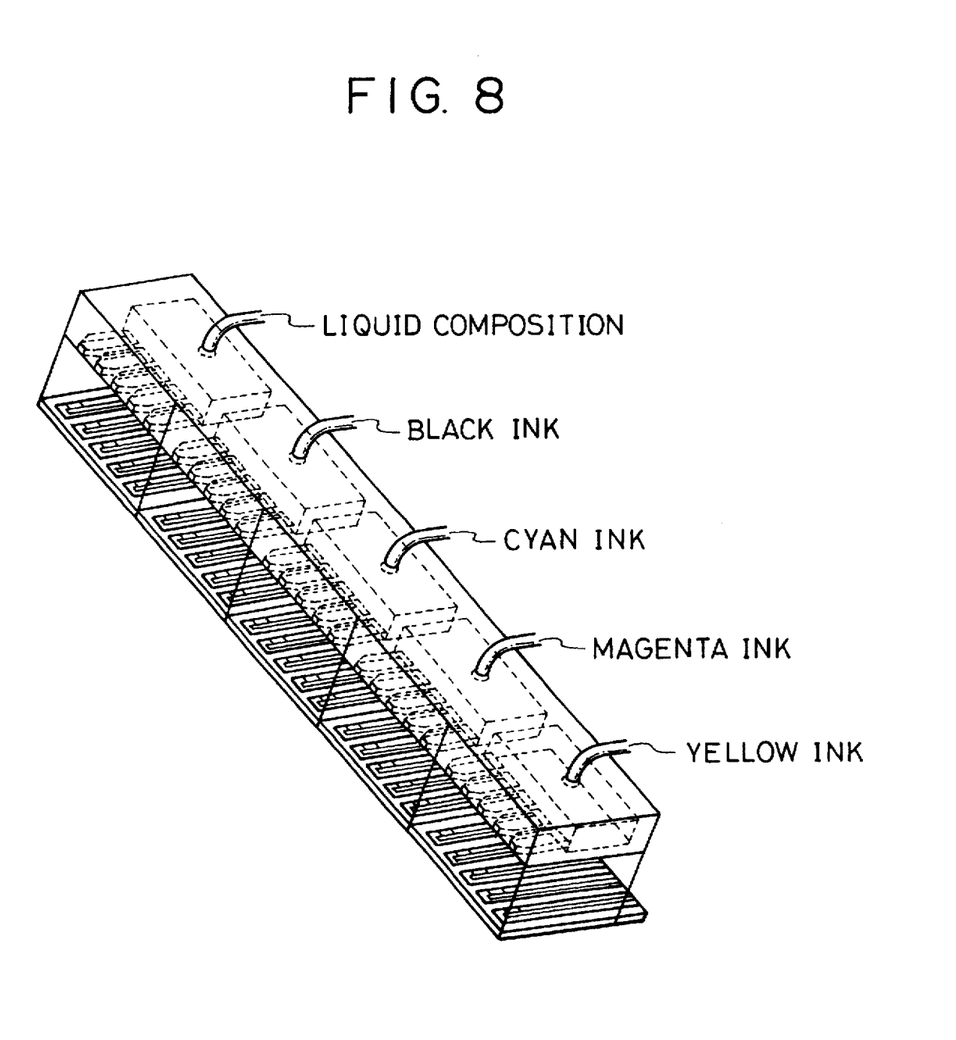
FIG. 8 is a perspective view of another recording head used in the present invention.

When performing the recording method of the present invention, a recording apparatus shown in FIG. 7 may be used, in which five recording heads shown in FIG. 3 are arranged on the carriage 80. These recording heads 81, 82, 83 and 84 discharge yellow, magenta, cyan, and black inks, respectively. Further, the liquid composition is discharged from head 85. These heads 81 to 85 are arranged in the recording apparatus and discharge the respective inks or liquid composition in response to recording signals. The number of recording heads is not restricted to the embodiment shown in FIG. 5, in which five heads are used. For example, the yellow ink, magenta ink, cyan ink, black ink, and liquid composition may be discharged from the respective nozzles in a long recording head as shown in FIG. 8.

EXAMPLES

The present invention is explained in more detail in the following EXAMPLES. In these EXAMPLES, "pbw" means parts by weight and the formulations are based on one hundred parts; "weight %" means percent by weight.

Example 1

The components described as M-1 below were well mixed to dissolve each other, and the mixture was filtered under pressure with a membrane filter having a pore size of 0.22 µm made by Sumitomo Electric Industries, Ltd., brand name: FLUOROPORE-FILTER. After the residual metallic ions in the mixture were removed by reverse osmosis, a colorless liquid composition M-1 remained. The pH of the liquid composition was adjusted to 4.0, and the water content of the liquid composition and of each ink was controlled so that the total amount of constituents was 100 parts.

The composition of M-1

| | |
|---|---|
| Metallic coordination compound (Aluminum-ethylenediamine tetraacetate coordination compound) | 1.0 pbw |
| Acrylamide polymer | 0.5 pbw |
| Thiodiethylene glycol | 15.0 pbw |
| Water | balance |

Then, after mixing the following components, the mixture was filtered under pressure with a membrane filter having a pore size of 0.22 µm made by Sumitomo Electric Industries, Ltd., brand name: FLUOROPORE-FILTER to prepare yellow (1)-Y, magenta (1)-M, cyan (1)-C, and black (1)-K inks.

The composition of yellow ink (1)-Y

| | |
|---|---|
| C.I. Direct Yellow 142 | 3 pbw |
| Thiodiethylene glycol | 15.0 pbw |
| Acetylenol EH (EO adduct of acetylene glycol, product of Kawaken Fine Chemicals Co. Ltd.) | 0.05 pbw |
| Water | balance |

The composition of magenta ink (1)-M

The same composition as (1)-Y except that 3.5 pbw of C.I. Acid Red 92 was compounded instead of 3 pbw of C.I. Direct Yellow 142.

The composition of cyan ink (1)-C

The same composition as (1)-Y except that 2.7 pbw of C.I. Acid Blue 9 was compounded instead of 3 pbw of C.I. Direct Yellow 142.

The composition of black ink (1)-K

The same composition as (1)-Y except that 3 pbw of C.I. Food Black 2 was compounded instead of C.I. Direct Yellow 142.

Recording was performed on commercial copy paper and bond paper using the obtained liquid composition and color inks. A recording apparatus similar to that shown in FIG. 4 with five recording heads as shown in FIG. 7 was used to form color images. Each recording head had a recording density of 360 dots per inch. The heads were driven with a drive frequency of 5 kHz, and the discharged volume per dot was 40 pl (picoliters). Recording was carried out in an atmosphere of 25° C. and 55% RH. These recording conditions obtained in all the lower case.

The recorded images were evaluated as follows:

1. Image density

Solid images formed with the liquid composition and the inks were evaluated with a Macbeth RD915 optical densitometer made by Macbeth Corp. 12 hours after image formation. The results were expressed based on the following standard:

Good: an optical density of 1.25 or more
Fair: an optical density of 1.15 to 1.24
No good: an optical density of less than 1.15

2. Quality of recorded characters

Black alphabetical and numerical characters recorded using the liquid composition and black ink were visually evaluated. Characters without remarkable feathering were evaluated as good, and characters of less than this level were evaluated as no good.

3. Bleeding

Solid images next to each other were recorded using the liquid composition, yellow ink, magenta ink, cyan ink, and black ink. The extent of bleeding at the boundaries of different colors was evaluated visually. Satisfactory bleeding level was evaluated as good and unsatisfactory levels were evaluated as no good.

4. Light resistance of the images

The light from a xenon lamp was irradiated on the recorded images obtained for the above evaluation items 1, 2 and 3 for 50 hours. Optical densities (OD values) before and after irradiation were measured. An image having an OD value after irradiation which was 90% or more of the original OD value was evaluated as good, and one with less than 90% of the original OD value was evaluated as no good.

5. Continuous discharge performance

The discharge continuity of the liquid composition was evaluated with the recording head shown in FIG. 7, while feeding continuous pulses 100,000,000 times. Three nozzles were used per one head. A run without trouble during the continuous test was evaluated as good, and a run which failed in discharge performance during the test was evaluated as no good.

In the present invention, the liquid composition is adhered to the same regions at which inks form images; the position on the recording medium on which the inks are discharged and the position on which the liquid composition is discharged is in a one-to-one ratio. Moreover, recording is carried out in one direction and the liquid composition is always discharged in advance of the inks in EXAMPLES 1 to 6.

Comparative Example

A recording and evaluation similar to EXAMPLE 1 was carried out except that the liquid composition used in EXAMPLE 1 was not used.

The results of the evaluation tests of EXAMPLE 1 and the COMPARATIVE EXAMPLE are summarized in Table 2. Table 2 clearly demonstrates that the results of image density, quality of characters, bleeding, light resistance, and continuous discharge performance are excellent in EXAMPLE 1, while an image having low image density, less light resistance and bleeding is obtained from the COMPARATIVE EXAMPLE.

TABLE 2

Results of Evaluation of EXAMPLE 1 and COMPARATIVE EXAMPLE

| Characteristic | EXAMPLE 1 | COMPARATIVE EXAMPLE |
|---|---|---|
| Image density | Good | No Good |
| Quality of character | Good | Good |
| Bleeding | Good | No Good |
| Light resistance | Good | No Good |
| Continuous discharge | Good | No Good |

Examples 2 to 6

Using the metallic coordination compounds shown in Table 3, liquid compositions were prepared as shown in Table 4. The liquid compositions of EXAMPLES 2 to 6 were evaluated by the same method as in EXAMPLE 1 using the same inks as in EXAMPLE 1. Results similar to the results in EXAMPLE 1 were obtained in EXAMPLEs 2 to 6. As shown in Table 4, other components except for the metallic coordination compound are the same as in EXAMPLE 1.

As described above, the present invention provides an image having excellent image density, high quality characters without bleeding, and excellent light resistance when color ink-jet recording is performed on plain paper. Further, the liquid composition of the present invention has excellent continuous discharge performance.

TABLE 3

Metallic Coordination Compounds Used in EXAMPLES 2 to 6

| No. | Compound | Preparation Method | Chemical Formula |
|---|---|---|---|
| 1 | Nickel/HEDTA(*1) | Mixed HEDTA with equimolar nickel | $\text{HOCH}_2\text{CH}_2$, $\text{HOOCCH}_2$ \ NCH$_2$CH$_2$N / $\text{CH}_2\text{COOH}$, $\text{CH}_2\text{COOH}$ + Ni (HEDTA) |
| 2 | Copper/NTA(*2) | Mixed NTA with equimolar copper | N(CH$_2$COOH)$_3$ + Cu (NTA) |
| 3 | Barium/TTHA(*3) | Mixed TTHA with equimolar barium | HOOCCH$_2$, HOOCCH$_2$ \ NCH$_2$CH$_2$NCH$_2$CH$_2$NCH$_2$CH$_2$N / CH$_2$COOH, HOOCCH$_2$, CH$_2$COOH, CH$_2$COOH + Ba (TTHA) |

TABLE 3-continued

Metallic Coordination Compounds Used in EXAMPLES 2 to 6

| No. | Compound | Preparation Method | Chemical Formula |
|---|---|---|---|
| 4 | Aluminum/HEDTA(*4) | Mixed HEDTA with equimolar aluminum | $HOCH_2CH_2$ \ $NCH_2CH_2N$ / $HOOCCH_2$ \ $CH_2COOH$ / $CH_2COOH$ + Al  HEDTA |

*1 hydroxyethylenediamine tetraacetate
*2 nitrilotriacetate
*3 diethylenetriamine pentaacetate
*4 hydroxyethylenediamine tetraacetate
All of these are brand names and were made by Chelest.

TABLE 4

Formulation of Liquid Compositions

| EX-AMPLE | Coordination Compound (A) | (A) Content (weight %) | Other Composition | pH of Liquid Composition |
|---|---|---|---|---|
| 2 | No. 1 | 2.0 | Same as EX. 1 | 6.0 |
| 3 | No. 2 | 1.5 | Same as EX. 1 | 5.0 |
| 4 | No. 3 | 0.5 | Same as EX. 1 | 8.0 |
| 5 | No. 4 | 1.2 | Same as EX. 1 | 3.8 |
| 6 | No. 1 | 1.8 | Same as EX. 1 | 6.0 |

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. A liquid composition comprising a metallic coordination compound which comprises a metallic ion and a ligand in a solvent, and a polymer selected from the group consisting of hydrochloric acid salt of polyallylamine, hydrochloric acid salt of polyaminesulfone, hydrochloric acid salt of polyvinyl amine, acetic acid salt of chitosan, polyacrylamide, polyvinyl alcohol, polyvinyl pyrrolidone, vinyl pyrrolidone-alkylamino acrylate quaternary salt copolymer, and acrylamide-aminomethylacrylamide quaternary salt copolymer.

2. A liquid composition according to claim 1, wherein the ligand has a coordination number of two or more.

3. A liquid composition according to claim 1, wherein the ligand has a coordination number of three or more.

4. A liquid composition according to claim 2, wherein said ligand is selected from the group consisting of glycine, ethylenediamine, propylenediamine, lactic acid, iminodiacetic acid, diethylenetriamine, dihydroxyethylglycine, hydroxyethyliminodiacetic acid, nitrilotriacetic acid, ethylenediaminetetraacetic acid, hydroxyethylethylenediaminetetraacetic acid, diethylenetriaminepentaacetic acid, and triethylenetetraminehexaacetic acid.

5. A liquid composition according to claim 1, wherein the metallic ion is selected from the group consisting of aluminum ion, nickel ion, copper ion, barium ion, calcium ion, iron ion and chromium ion.

6. A liquid composition according to claim 1, wherein the polymer has a number average molecular weight of 1,000 or more.

7. A liquid composition according to claim 1, wherein the content of said metallic coordination compound ranges from 0.05 to 8.0 percent by weight.

8. A liquid composition according to claim 1, wherein said solvent comprises water and a water-soluble organic solvent.

9. A liquid composition according to claim 1, wherein the content of said polymer ranges from 0.05 to 20 percent by weight.

10. An ink set comprising a combination of the liquid composition of any one of claims 1 through 9 and at least one ink selected from the group consisting of yellow, magenta, cyan, black, red, blue, and green.

11. An ink set comprising a combination of the liquid composition described in any one of claims 1 through 9 and yellow, magenta, and cyan color inks.

12. An ink set comprising a combination of the liquid composition described in any one of claims 1 through 9 and yellow, magenta, cyan, and black color inks.

13. An ink set according to claim 10, wherein said ink comprises an anionic compound.

14. An ink set according to claims 1 through 9, wherein said ink contains an water-soluble dyestuff having an anionic group.

15. A method for forming an image comprising a step (A) of adhering the liquid composition of one of claims 1 through 9 to at least an image-forming region of a recording medium, and a step (B) of discharging an ink containing at least an anionic compound onto said recording medium by an ink-jet system.

16. A method for forming an image according to claim 15, wherein said ink-jet system is an on-demand ink-jet system.

17. A method for forming an image according to claim 15, wherein said liquid composition is adhered to the recording media by the ink-jet system.

18. A method for forming an image according to claim 15, wherein said ink-jet system is an ink-jet system which applies heat energy to the ink.

19. A method for forming an image according to claim 15, wherein said step (A) is performed before said step (B).

20. A method for forming an image according to claim 15, wherein said step (A) is performed after said step (B).

21. An apparatus for forming an image comprising the ink set of claim 10 and an ink-jet means.

22. An apparatus for forming an image according to claim 21, wherein said liquid composition and said ink are separately contained.

23. An apparatus for forming an image comprising a first recording unit having a reserving portion and a discharging means for said liquid composition of any one of claims 1 through 9 and a second recording unit having a reserving portion and a discharging means for an ink containing at least an anionic compound.

24. An apparatus for forming an image according to claim 23, wherein said discharging means is an ink-jet means.

25. An apparatus for forming an image according to claim 24, wherein said ink-jet means is a means for forming an ink drop by applying heat energy to the ink.

* * * * *

UNITED STATES PATENT AND TRADEMARK OFFICE
CERTIFICATE OF CORRECTION

PATENT NO. : 5,792,249

DATED : August 11, 1998

INVENTOR(S): KATSUHIRO SHIROTA, ET AL.

It is certified that error appears in the above-identified patent and that said Letters Patent is hereby corrected as shown below:

COLUMN 1:

Line 37, "phenomena" should read --phenomenon--.

COLUMN 6:

Line 58, "means" should read --mean--.

COLUMN 8:

Line 2, "four color" should rad --four-color--.

COLUMN 14:

Line 46, "an" (first occurrence) should read --a--.

Signed and Sealed this

Eleventh Day of January, 2000

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT : 5,792,249

DATED : August 11, 1998

INVENTOR(S) : KATSUHIRO SHIROTA, ET AL.

It is certified that error appears in the above-identified patent and that said Letters Patent is hereby corrected as shown below:

<u>COLUMN 14</u>:

Line 45, "claims 1 through 9" should read --claim 10--.

Signed and Sealed this

Eighth Day of February, 2000

Attest:

Q. TODD DICKINSON

Attesting Officer

Commissioner of Patents and Trademarks